United States Patent [19]

Herting

[11] Patent Number: 5,547,155
[45] Date of Patent: Aug. 20, 1996

[54] ADJUSTABLE SEAT POST ADAPTOR ASSEMBLY FOR BICYCLES AND LIKE CYCLES

[75] Inventor: Eric Herting, Valencia, Calif.

[73] Assignee: Answer Products, Inc., Valencia, Calif.

[21] Appl. No.: 299,530

[22] Filed: Sep. 1, 1994

[51] Int. Cl.[6] ........................................ B62J 1/00
[52] U.S. Cl. ................................ 248/219.2; 248/283.1; 248/600; 297/215.15; 403/389; 403/82
[58] Field of Search ........................ 248/219.2, 286, 248/285, 176, 371, 178, 393, 397, 600; 297/215.15; 403/389, 391, 52, 82, 83, 84

[56] References Cited

U.S. PATENT DOCUMENTS

| 2,920,911 | 1/1960 | Campagnolo | 403/389 |
|---|---|---|---|
| 4,108,462 | 8/1978 | Martin | 248/286 |
| 4,275,922 | 6/1981 | Juy | 403/82 |
| 4,568,121 | 2/1986 | Kashima | 297/195 |
| 4,995,753 | 2/1991 | Shook | 297/215.15 |
| 5,190,346 | 3/1993 | Ringle | 297/215.15 |
| 5,226,624 | 7/1993 | Kingsberry | 248/219.2 |
| 5,228,796 | 7/1993 | Kao | 248/316.4 |
| 5,295,727 | 3/1994 | Kao | 403/391 |
| 5,382,039 | 1/1995 | Hawker | 280/283 |
| 5,383,706 | 1/1995 | Chen | 297/215.15 |
| 5,441,327 | 8/1995 | Sanderson | 297/195.1 |

FOREIGN PATENT DOCUMENTS

| 2233216 | 1/1975 | France | 297/215.15 |
|---|---|---|---|
| 2585318 | 1/1987 | France | 297/215.15 |
| 2632147 | 1/1978 | Germany | 297/215.15 |

Primary Examiner—Karen J. Chotkowski
Assistant Examiner—Anita M. King
Attorney, Agent, or Firm—Thomas I. Rozsa; Tony D. Chen

[57] ABSTRACT

The present invention is an adjustable seat post adaptor assembly used in conjunction with bicycles and like cycles for supporting seats. The adjustable seat post adaptor assembly has an independent adjustment where a rider can adjust the seat in a horizontal direction. The adjustable seat post adaptor assembly also has an easily accessible adjustment for allowing the seat to be independently tilted in a vertical direction. The assembly has a calibration scale for assisting the rider to tell the previously set tilting position.

53 Claims, 5 Drawing Sheets

ADJUSTABLE SEAT POST ADAPTOR ASSEMBLY FOR BICYCLES AND LIKE CYCLES

BACKGROUND OF THE INVENTION

1. Field of the Invention

The present invention relates to the field of design and construction of bicycle seat post adaptor assemblies. More particularly, the present invention relates to the field of design and construction of adjustable seat post adaptor assemblies for bicycles and like cycles.

2. Description of the Prior Art

Generally, seat post adaptor assemblies for supporting bicycle seats have long been utilized in the bicycle industry. The prior art seat post adaptor assemblies generally support the bicycle seat and some have a clamping mechanism for adjusting the seat in the up or down positions. One of the disadvantages with the prior art seat post adaptor assemblies is that the set screw for the adjustment is often very difficult to access and adjust. Another disadvantage is that there is no means for adjusting the bicycle seat in the horizontal direction. A further disadvantage is that there is no precise measurements to facilitate the vertical adjustment of the seat.

One of the problems with the set screw adjustment in the prior art is that when a rider desires to change the bicycle seat in the horizontal direction, the set screw for the horizontal adjustment is loosened to change the horizontal position of the bicycle seat, but in doing so the vertical position of the bicycle seat becomes affected and the vertical position of the bicycle seat must be repositioned again for the rider.

None of the prior art seat post adaptor assemblies have a totally independent adjustment means for the vertical, or the forward and backward adjustments.

Therefore, it is desirable to provide a new design and construction of an adjustable seat post adaptor assembly for bicycles and the like which can provide a rider with all of the desired functions and features of quick and precise adjustment. It is desirable to have an adjustable seat post adaptor assembly wherein the tiltable adjustment can easily be done and a calibration scale is provided to facilitate the tiltable adjustment. It is also desirable to have means for adjusting the bicycle seat in the horizontal direction so that the rider can ride the bicycle more comfortably.

SUMMARY OF THE INVENTION

The present invention is a novel and unique adjustable seat post adaptor assembly used in conjunction with bicycles and like vehicles for supporting seats. The real novelty of the seat post adaptor assembly design is not the fact that it can be adjusted vertically, or forwardly and backwardly but that it allows a rider to accomplish those adjustments independently of one another. The present invention has both a horizontal adjustment where the rider can adjust the seat in a horizontal direction, and a quick "rocker" tilting adjustment for easily accessible tilting of the seat in the vertical direction. The seat post adaptor assembly further has a precise calibration measurement scale for facilitating the tilt adjustment so that the rider does not have to guess his or her previous tilting position.

It has been discovered, according to the present invention, that by having rocking arms on an adjustable seat post adaptor assembly, it will provide a quick way and an independent adjustment for facilitating the vertical adjustments of a bicycle seat.

It has additionally been discovered, according to the present invention, that by having an easily adjustable clamping member on the adjustable seat post adaptor assembly, it will provide a quick and independent adjustment in a horizontal direction.

It has further been discovered, according to the present invention, that by having a calibration measurement scale on the adjustable seat post adaptor assembly, it will provide means to facilitate and enable the rider to reposition the seat in the vertical positions.

It is therefore an object of the present invention to provide an adjustable seat post adaptor assembly for bicycle seats and like cycle seats.

It is also an object of the present invention to provide an adjustable seat post adaptor assembly with rocking arms so that the bicycle seat and the like seat can be quickly and independently adjusted in the vertical position with an easily accessible set screw for fastening the rocking arms.

It is an additional object of the present invention to provide an adjustable seat post adaptor assembly with an adjustable clamping member so that a rider can easily and independently adjust the bicycle seat in a horizontal direction.

It is a further object of the present invention to provide an adjustable seat post adaptor assembly with a calibration measurement scale, so that a rider can reposition the bicycle seat without guessing.

In the preferred embodiment of the present invention, the adjustable seat post adaptor assembly utilizes an X-shaped clamping member for clamping and securing the seat down on the adjustable seat post adaptor assembly.

In an alternative embodiment of the present invention, the adjustable seat post adaptor assembly utilizes a narrow rectangular shaped clamping member for clamping and securing the seat down on the adjustable seat post adaptor assembly.

In another alternative embodiment of the present invention, the adjustable seat post adaptor assembly utilizes a wide square shaped clamping member for clamping and securing the seat down on the adjustable seat post adaptor assembly.

In a further alternative embodiment of the present invention, the adjustable seat post assembly has a single sided rocking arm.

In an additional alternative embodiment of the present invention, the adjustable seat post assembly has a central rocking arm.

The present invention is not limited only to these embodiments mentioned above. It will be appreciated that there are a number of embodiments which are a combination of the embodiments mentioned above.

In general, the uniqueness of the present invention is the combination of the horizontal adjustment wherein the bicycle seat can be adjusted in the horizontal direction and rocking arms for adjusting the bicycle seat in the vertical direction.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
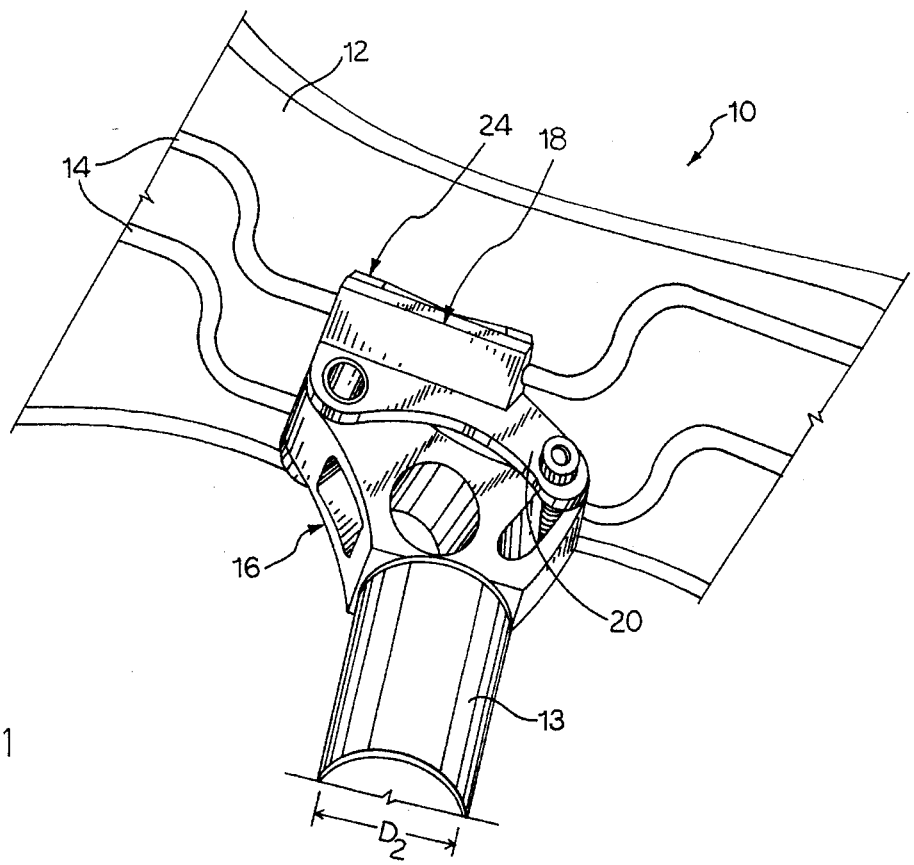
FIG. 1 is a bottom perspective view of the preferred embodiment of the present invention adjustable seat post adaptor assembly illustrating all of the elements.

Referring to FIG. 1, there is shown at 10 a preferred embodiment of the present invention adjustable seat post adaptor assembly which is used in conjunction with a conventional bicycle seat 12 and an extension post 13 attached to a seat tube (not shown) of a bicycle or like cycle. The present invention can be used with bicycles that have a seat tube with the extension post 13 for mounting the adjustable seat post adaptor assembly 10, such as mountain bikes, exercise bikes, etc., but are not limited to these two types of bikes and can be used with other cycles as well.

The conventional bicycle seat 12 includes two U-shaped bars 14 or rails which are located underneath the seat 12. The U-shaped portions extend down from underneath the bicycle seat 12 so that it can be clamped by the adjustable seat post adaptor assembly 10.

The adjustable seat post adaptor assembly 10 primarily includes three pieces: an adapter member 16, a base plate member 18 with two rocking arms 20 and 22, and a clamping member 24, and all assembled together to form the present invention.

Figure 2:
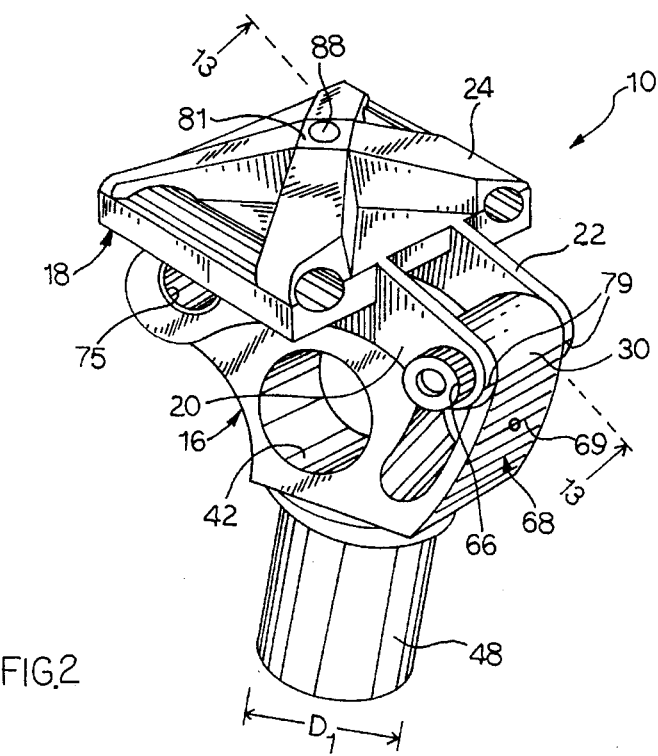
FIG. 2 is a top perspective view of the preferred embodiment of the present invention adjustable seat post adaptor assembly illustrating an X-shaped clamping member.
Figure 3:
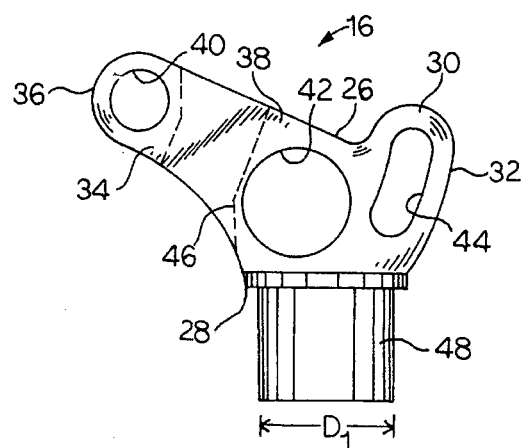
FIG. 3 is a side elevational view of an adapter member of the adjustable seat post adaptor assembly for adapting to an extension post of a seat tube.
Figure 4:
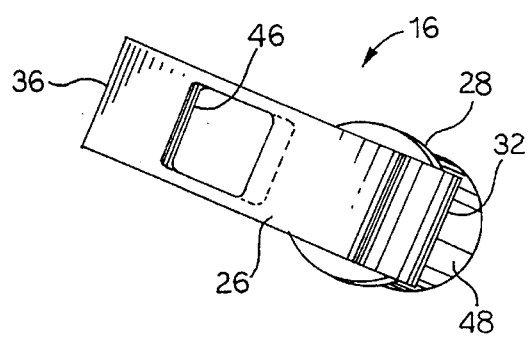
FIG. 4 is a top plan view of the adapter member.
Figure 5:
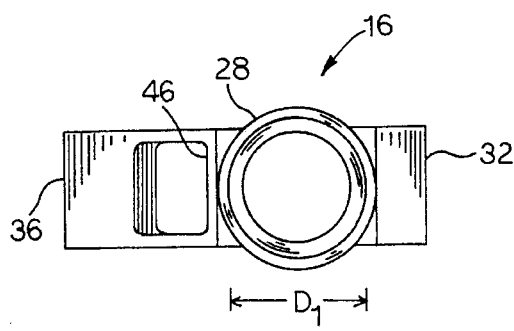
FIG. 5 is a bottom plan view of the adapter member.
Figure 6:
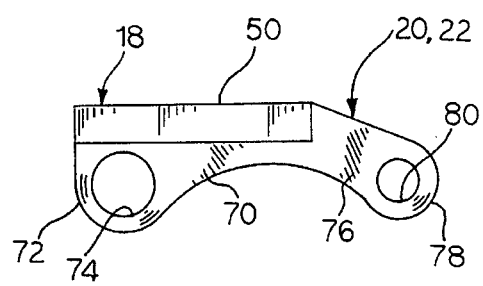
FIG. 6 is a side elevational view of a base plate member with rocking arms.
Figure 7:
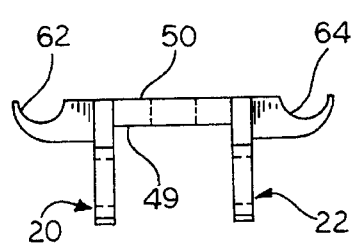
FIG. 7 is a front elevational view of the base plate member with rocking arms.
Figure 8:
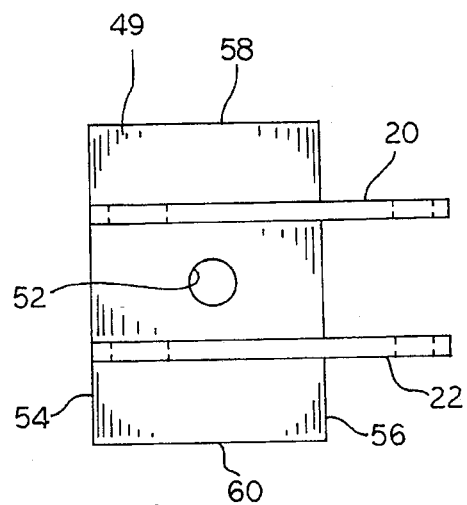
FIG. 8 is a bottom plan view of the base plate member with rocking arms.

Referring to FIG. 2, there is shown a top perspective view of the present invention adjustable seat post adaptor assembly 10 which illustrates the preferred embodiment of an X-shaped clamping member 24. This figure shows all of the elements of the adjustable seat post adaptor assembly 10 in the assembled form.

Referring to FIGS. 1 through 5 and 13, the adapter member 16 has a top end 26, a bottom end 28, a front portion 30 with a front end 32, a middle portion 38, and a rear portion 34 with a rear end 36. The rear and middle portions 34, 38 each has a horizontal bore 40 and 42 respectively. The bore 42 reduces the weight of the adapter member 16. The front portion 30 has a horizontal slotted curved bore 44. There is also a vertical opening 46 which is located between the two horizontal bores 40 and 42 of the rear and middle portions 34 and 38. The adapter member 16 further includes a cylindrical tube member 48 which is integrally connected to the bottom end 28 and extends downward. The cylindrical tube member 48 has an outer diameter $D_1$ which is sightly less than an inner diameter $D_2$ of the extension post 13 which in turn is clamped to the seat tube of the bicycle such that the cylindrical tube member 48 can be press-fitted into the extension post 13 which in turn is clamped to the seat tube. In one embodiment, the outer diameter $D_1$ of the cylindrical tube 48 is approximately 1.060 inches.

The specific outer diameter $D_1$ of the cylindrical tube member 48 is precisely ground to within one-thousandth (1/1000) of an inch precision diameter. By having the precision cylindrical tube member 48 specifically ground to this dimension, a precise outer diameter $D_1$ can be press-fitted into the inner diameter $D_2$ of the extension post 13.

It will be appreciated that the present invention is not limited to the method of press-fit engagement of the cylindrical tube member 48 to the extension post 13 as described above. It is emphasized that while the press-fit engagement is the preferred method of connecting the cylindrical tube member 48 to the extension post 13, it is also within the spirit and scope of the present invention to bond the cylindrical tube member 48 to the extension post 13 or the cylindrical tube member 48 can be welded to the extension post 13 or connected by any other suitable means.

In still another embodiment, the bottom end 28 of the adapter member 16 can be integrally formed with the extension post 13 as a one piece unit, thereby eliminating the cylindrical tube member 48 and eliminating the need for an engagement means such as press-fit, welding or bonding. In this embodiment, the adapter member 16 has a top adapter portion and a bottom extension post portion.

Referring to FIG. 2, there is illustrated a calibration measurement scale means 68 which is located on the front end 32 of the adapter member 16 for assisting a user to adjust the seat at an angle. The calibration measurement scale 68 is utilized to measure the angle of the seat. It includes a plurality of equally spaced apart divisions. Each division represents a 2° change of angle in the up or down direction. The calibration scale means 68 also has a zero division 69 for indicating that the seat is parallel to the ground. The range of the scale means 68 is approximately 16°, 8° in the up direction and 8° in the down direction.

It will be appreciated that the dimension and degree of angle described above are merely one illustrative embodiment and can include many other comparable sets of dimensions and degree of angles incorporated into the present invention.

While the calibration scale means 68 is illustrated on the front end 32 of the adapter member 16, this is only one location. The calibration scale means 68 can also be located on any other visible portion of the adapter member 16, such as on either side of the adapter member 16 or on the rear end 36 of the adapter member 16.

Referring to FIGS. 2, 6, 7 and 8, there is shown the base plate member 18 of the present invention. The base plate member 18 has a lower surface 49, an upper surface 50, a central bore 52, two transverse sides 54 and 56, two longitudinal sides 58 and 60, and two parallel longitudinal opposite semi-circular grooves 62 and 64 which are located on the upper surface 50 and adjacent and parallel to the two longitudinal sides 58 and 60 respectively.

The two rocking arms 20 and 22 are integrally connected to the base plate member 18 wherein each rocking arm has a proximal portion 70 with a proximal end 72 and a horizontal proximal bore 74, and a distal portion 76 with a distal end 78 and a horizontal distal bore 80. The proximal portions 70 of the rocking arms 20 and 22 are integrally connected to the lower surface 49 of the base plate member 18 and located between the central bore 52, such that the distal ends 78 of the rocking arms 20 and 22 are projected away from the base plate member 18. Each distal end 78 has an indicating marker 79 for aligning to each division on the calibration measurement scale means 68 so that it will assist the rider to tell the previously set tilting adjustment. However, it is not essential for the indicating marker 79 to be located on each distal end 78. The indicating marker 79 can be anywhere on the face of one of the two rocking arms 20 and 22 so that it serves to assist the rider to tell the previously set tilting adjustment.

Figure 13:
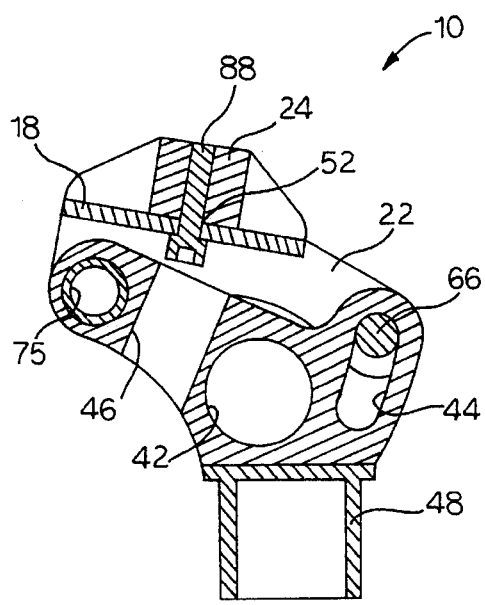
FIG. 13 is a cross-sectional view of the preferred embodiment of the present invention adjustable seat post adaptor assembly taken along line 13—13 of FIG. 2.

Referring to FIG. 13, there is shown a cross-sectional view of the present invention adjustable seat post adaptor assembly 10. The base plate member 18 is mounted at the top end 26 of the adapter member 16 such that the central bore 52 of the base plate member 18 is located adjacent to the vertical opening 46 of the adapter member 12 and the two rocking arms 20 and 22 are located on each side thereof. The horizontal proximal bores 74 of the rocking arms 20 and 22 are aligned with the horizontal bore 40 of the rear portion 34 of the adapter member 16 and hingeably attached thereto by a pin 75. The horizontal distal bores 80 of the rocking arms 20 and 22 are aligned with the horizontal slotted bore 44 of the adapter member 18, and the rocking arms 20 and 22 are adjustably fastened by a threaded fastener 66 for allowing the base plate member 18 to be independently adjusted in an up or down direction. By up or down direction, the inventor means the vertical direction or tilting of the angle of the rocking arms 20 and 22 to adjust the angle of the seat so that it raises or lowers the seat in the vertical direction. The slotted bore 44 is curved to allow rocking movement of the rocking arms 20 and 22.

Referring to FIGS. 2 and 9 through 13, there is shown the present invention clamping member 24 which is shaped like an "X". The X-shaped clamping member 24 includes a central portion 81 with a central bore 82 and four semi-circular grooves 84, each located at a respective tip 86 of the X-shaped clamping member 24. The X-shaped clamping member 24 is clamped onto the upper surface 50 of the base plate member 18 such that the central bore 82 is aligned with the central bore 52 of the base plate member 18 and fastened by a threaded means 88. The vertical opening 46 of the adapter member 16 is provided for easy access to the threaded means 88 and is wide enough to accommodate the rocking position of the base plate 18. The four semi-circular grooves 84 are complementary to the two longitudinal opposite semi-circular grooves 62 and 64 of the base plate member 18 respectively for allowing the two bars of the bicycle seat to be secured therein and readily adjustable in a forward or backward direction. The X-shaped clamping member 24 further includes a plurality of cavities 90 for reducing the weight of the adjustable seat post adaptor assembly 10.

The adjustable seat post adaptor assembly 10 can be made from several materials. By way of example only, the adjustable seat post adaptor assembly 10 is made of aluminum material. It will be appreciated that the present invention adjustable seat post adaptor assembly 10 can be made of any suitable light-weight metal material.

Figure 14:
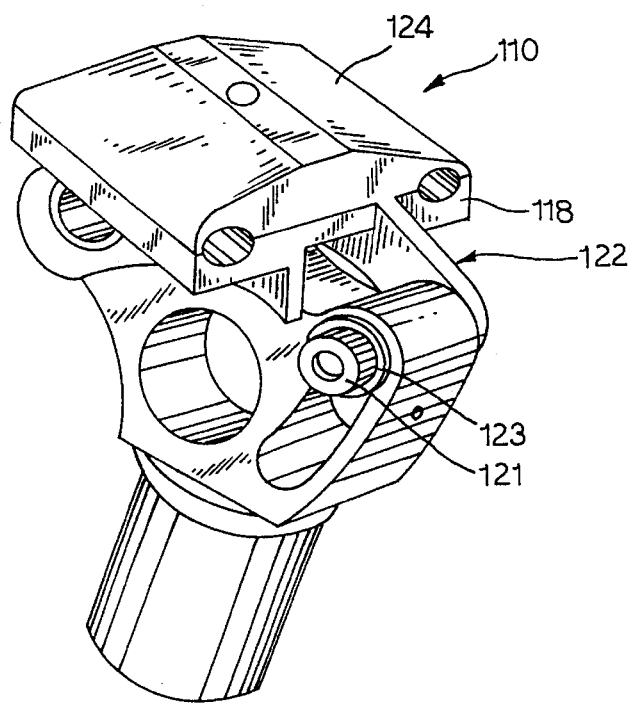
FIG. 14 is a top perspective view of an alternative embodiment of the present invention adjustable seat post adaptor assembly utilizing a single sided rocking arm and a wide clamping member.

Referring to FIG. 14, there is shown a perspective view of an alternative embodiment of the present invention adjustable seat post adaptor assembly 110 which utilizes a wide clamping member 124 and a single sided rocking arm 122. All other components are the same as previously described in FIGS. 1 through 13, and the description thereof will not be repeated and only the modified components will be described in detail. In this alternative embodiment, the components are numbered correspondingly with 100 added to each number.

Figure 16:
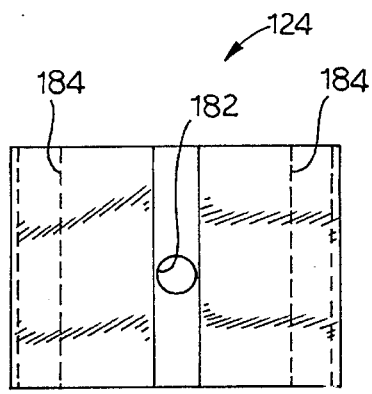
FIG. 16 is a top plan view of the wide clamping member.
Figure 18:
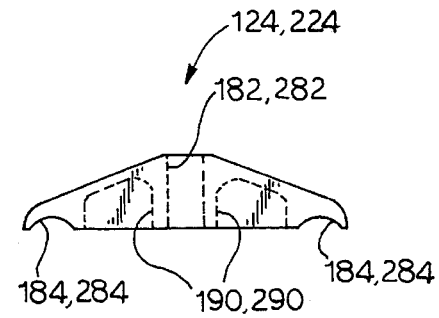
FIG. 18 is a side elevational view of the clamping members in FIGS. 16 and 17.

Referring to FIGS. 14, 16 and 18, the generally wide square shaped clamping member 124 has a central bore 182, two longitudinal parallel semi-circular grooves 184 and a plurality of cavities 190 for reducing the weight of the clamping member 124.

In addition, there is only one rocking arm 122 which is integrally connected to the base plate member 118 and located on one side of the plate member 118. A washer 123 may be used in conjunction with a locking member 121.

Figure 15:
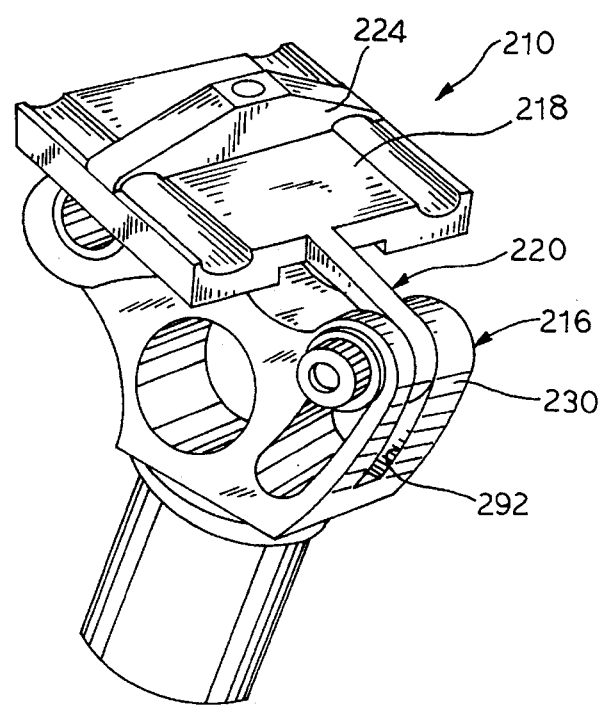
FIG. 15 is a top perspective view of another alternative embodiment of the present invention adjustable seat post adaptor assembly utilizing a single central rocking arm and a narrow clamping member.

Referring to FIG. 15, there is shown a perspective view of another alternative embodiment of the present invention adjustable seat post adaptor assembly 210 which utilizes a narrow clamping member 224 and a single central rocking arm 220. All other components are the same as previously described in FIGS. 1 through 13, and the description thereof will not be repeated and only the modified components will be described in detail. In this alternative embodiment, the components are numbered correspondingly with 200 added to each number.

Figure 9:
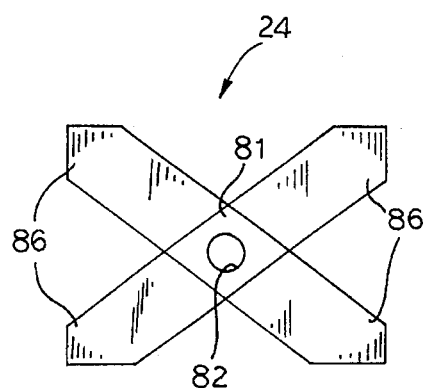
FIG. 9 is a top plan view of an X-shaped clamping member.
Figure 11:
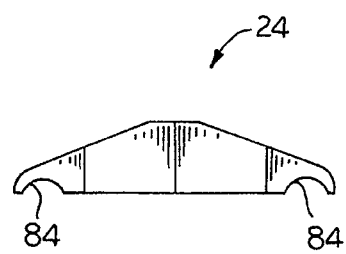
FIG. 11 is side elevational view of the X-shaped clamping member.
Figure 10:
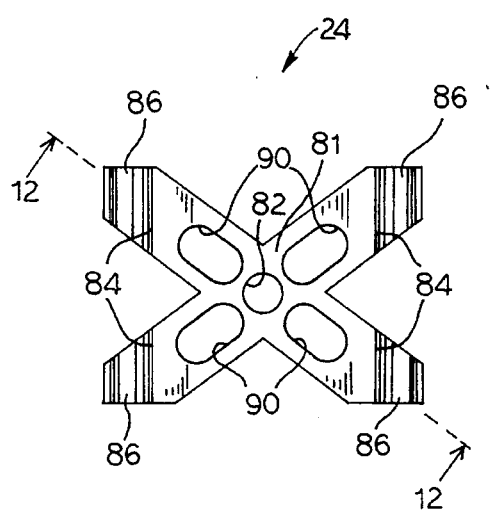
FIG. 10 is a bottom plan view of the X-shaped clamping member.
Figure 12:
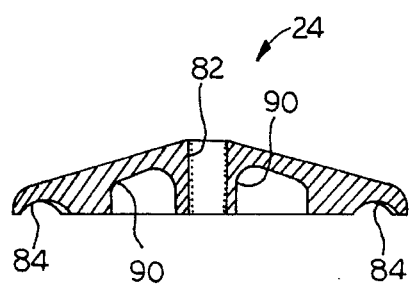
FIG. 12 is a cross-sectional view taken along line 12—12 of FIG. 10.
Figure 17:
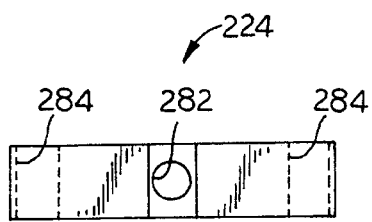
FIG. 17 is a top plan view of the narrow clamping member.

Referring to FIGS. 15, 17 and 18, the X-shaped clamping member shown in FIGS. 9 and 10 is substituted with a generally narrow rectangular shaped clamping member 224. The clamping member 224 has a central bore 282, two longitudinal parallel semi-circular grooves 284 and a plurality of cavities 290 for reducing the weight of the adjustable seat post adaptor assembly 210.

There is only one central rocking arm 220 which is integrally connected to the base plate member 21 8 in this embodiment. The front end 230 of the adapter member 216 is modified to receive the central rocking arm 220. The front end 230 has a slotted curved opening 292 for allowing the central rocking arm 220 to move therein so that the base member 218 can be independently adjusted in the vertical direction.

It will be appreciated that the X-shaped clamping member 24 shown in FIGS. 9 and 10 can be utilized with the alternative embodiments shown in FIGS. 14 and 15, and the clamping members 124 and 224 shown in FIGS. 16 and 17 respectively can be used vice versa.

One of the unique features of the adjustable seat post adaptor assembly 10 is that the horizontal and vertical adjustments are independent of one another. No prior art has anything similar to this unique feature of the present invention.

Defined in detail, the present invention is an adjustable seat post adaptor assembly for a bicycle having a seat with at least two bars located underneath the seat and an extension post attached to a seat tube, the assembly comprising: (a) an adapter member having a bottom end, a top end, a rear portion with a rear end, a middle portion, and a front portion with a front end, the rear and middle portions each having a horizontal bore, the front portion having a horizontal slotted curved bore, the adapter member further having a vertical opening located between the two horizontal bores of the rear and middle portions; (b) a calibration scale means located on said front end of said adapter member and having a plurality of divisions for precisely adjusting an angle of said seat of said bicycle; (c) a cylindrical member having one end integrally connected to said bottom end of said adapter member and the other end connected to said extension post; (d) a base plate member having a lower surface, an upper surface, a central bore, two transverse sides, two longitudinal sides, and two longitudinal opposite semi-circular grooves located on the upper surface and adjacent and parallel to the two longitudinal sides respectively; (e) two rocking arms integrally connected to said lower surface of said base plate member and located between said central bore of said base plate member, each rocking arm having a proximal portion with a proximal end and a horizontal proximal bore, and a distal portion with a distal end and a horizontal distal bore, the distal portions extending away from said base plate member; (f) said base plate member mounted to said top end of said adapter member such that said central bore of said base plate member is located adjacent to said vertical opening of said adapter member, said horizontal proximal bores located adjacent to and aligned with said horizontal bore of said rear portion of said adapter member for hinging said base plate member to said adapter member; (g) said horizontal distal bores of said rocking arms being aligned with said horizontal slotted curved bore of said adapter member and fastened by a first threaded fastener means for allowing said base plate member to be independently adjusted in an up or down position; and (h) an X-shaped clamping member having a central portion with a central bore and four extending tips each having a semi-circular groove for clamping onto said upper surface of said base plate member, such that the central bore is aligned with said central bore of said base plate member for receiving a second threaded fastener means extending therethrough to fasten the clamping member to said base plate member, the four semi-circular grooves being complementary to said two longitudinal opposite semi-circular grooves of said base plate member respectively for allowing said at least two bars of said seat to be secured therein to independently adjust said seat in a forward or backward direction; (i) whereby when said adjustable seat post adaptor assembly is assembled, said second threaded fastener means allows said seat of said bicycle to be independently adjusted in said forward or backward direction, and said first threaded fastener means allows said seat to be independently adjusted in said up or down direction.

Defined broadly, the present invention is a seat post adaptor assembly for a bicycle having a seat with at least two bars located underneath the seat and an extension post attached to a seat tube, the assembly comprising: (a) an adapter member having a bottom end, a top end, a rear portion with a rear end, and a front portion with a front end, the rear portion having a horizontal bore and a vertical opening, and the front portion having a horizontal slotted curved bore; (b) a calibration scale means located on said adapter member and having a plurality of divisions for precisely adjusting an angle of said seat of said bicycle; (c) a cylindrical member having one end integrally connected to said bottom end of said adapter member and the other end connected to said extension post; (d) a base plate member having a lower surface, an upper surface, a bore, and at least two opposite parallel semi-circular grooves located on the upper surface, the base plate member mounted to said adapter member such that the bore of said base plate member is located adjacent to said vertical opening of said rear portion of said adapter member; (e) at least one rocking arm integrally connected to said lower surface of said base plate member, the least one rocking arm having a proximal end with a proximal horizontal bore, and a distal end with a horizontal distal bore, the horizontal proximal bores located adjacent to and aligned with said horizontal bore of said rear portion of said adapter member for hinging said base plate member to said adapter member, and the distal end extending away from said base plate member; (f) said horizontal distal bore of said at least one rocking arm being aligned with said horizontal slotted curved bore of said adapter member and fastened by a first fastener means for allowing said base plate member to be independently adjusted in an up or down position; and (g) a clamping member having a bore and at least two opposite semi-circular grooves for clamping onto said upper surface of said base plate member, such that the bore is aligned with said bore of said base plate member for receiving a second fastener means extending therethrough to fasten the clamping member to said base plate member, the at least two opposite semi-circular grooves being complementary to said at least two opposite semi-circular grooves of said base plate member respectively for allowing said at least two bars of said seat to be secured therein to independently adjust said seat in a forward or backward direction; (h) whereby when said seat post adaptor assembly is assembled, said second fastener means allows said seat of said bicycle to be independently adjusted in said forward or backward direction, and said first fastener means allows said seat to be independently adjusted in said up or down direction.

Defined more broadly, the present invention is a seat post adaptor assembly for a cycle which includes a seat with at least two rails and an extension post attached to a seat tube, the assembly comprising: (a) an adapter means having a bottom end, a rear portion, and a front portion, the rear portion having a bore and an opening, and the front portion having a slotted bore; (b) a tube means having one end integrally connected to said bottom end of said adapter means and the other end connected to said extension post; (c) a base plate means mounted to said adapter means and having a bore and at least two grooves; (d) at least one rocking arm integrally connected to said base plate means and having a proximal end and a distal end with a distal bore for allowing said base plate means to be independently adjusted in a vertical direction; and (e) a clamping means having a bore and at least two grooves for clamping to said base plate means, such that the bore is aligned with said bore of said base plate means, the at least two grooves being complementary to said at least two grooves of said base plate means respectively for allowing said at least two rails of said seat to be secured therein to independently adjust said seat in a horizontal direction; (f) whereby when said seat post adaptor assembly is assembled, the adjustment of said clamping means allows said seat to be independently adjusted in said horizontal direction, and the adjustment of said at least one rocking arm allows said seat to be independently adjusted in said vertical direction.

Defined even more broadly, the present invention is a seat post adaptor assembly for a cycle which includes a seat, an extension tube attached to a seat tube, and connector means, the assembly comprising: (a) an adapter means having a bottom end, a rear portion, and a front portion, the rear portion having a bore and an opening, and the front portion having a transverse slotted bore and a longitudinal slotted bore; (b) a tube means having one end integrally connected to said bottom end of said adapter means and the other end connected to said extension tube; (c) a base plate means mounted to said adapter means and having a bore and at least two grooves; (d) a single central rocking arm integrally connected to said base plate means and connected to said longitudinal slotted bore of said adapter means for allowing said base plate means to be independently adjusted in a vertical direction; and (e) a clamping means having a bore and at least two grooves for clamping to said base plate means, such that the bore is aligned with said bore of said base plate means, the at least two grooves being complementary to said at least two grooves of said base plate means respectively for allowing said connection means of said seat to be secured therein to independently adjust said seat in a horizontal direction; (f) whereby when said seat post adaptor assembly is assembled, the adjustment of said clamping means allows said seat to be independently adjusted in said horizontal direction, and the adjustment of said central rocking arm allows said seat to be independently adjusted in said vertical direction.

Defined alternatively in detail, the present invention is a seat post adaptor assembly for a bicycle having a seat with at least two bars located underneath the seat and a seat tube, the assembly comprising: (a) an integral adapter member having a top adaptor portion and a bottom extension post portion, the top adaptor portion having a bottom end, a top end, a rear portion with a rear end, and a front portion with a front end, the rear portion having a horizontal bore and a vertical opening, the front portion having a horizontal slotted curved bore, the bottom extension post portion having an elongated cylinder attachable to said seat tube of said seat, where the elongated cylinder is integrally formed with the bottom end of said top adaptor portion; (b) a calibration scale means located on said adapter member and having a plurality of divisions for precisely adjusting an angle of said seat of said bicycle; (c) a base plate member having a lower surface, an upper surface, a bore, and at least two opposite parallel semi-circular grooves located on the upper surface, the base plate member mounted to said adapter member such that the bore of said base plate member is located adjacent to said vertical opening of said rear portion of said adapter member; (d) at least one rocking arm integrally connected to said lower surface of said base plate member, the least one rocking arm having a proximal end with a proximal horizontal bore, and a distal end with a horizontal distal bore, the horizontal proximal bores located adjacent to and aligned with said horizontal bore of said rear portion of said adapter member for hinging said base plate member to said adapter member, and the distal end extending away from said base plate member; (e) said horizontal distal bore of said at least one rocking arm being aligned with said horizontal slotted curved bore of said adapter member and fastened by a first fastener means for allowing said base plate member to be independently adjusted in an up or down position; and (f) a clamping member having a bore and at least two opposite semicircular grooves for clamping onto said upper surface of said base plate member, such that the bore is aligned with said bore of said base plate member for receiving a second fastener means extending therethrough to fasten the clamping member to said base plate member, the at least two opposite semi-circular grooves being complementary to said at least two opposite semi-circular grooves of said base plate member respectively for allowing said at least two bars of said seat to be secured therein to independently adjust said seat in a forward or backward direction; (g) whereby when said seat post adaptor assembly is assembled, said second fastener means allows said seat of said bicycle to be independently adjusted in said forward or backward direction, and said first fastener means allows said seat to be independently adjusted in said up or down direction.

Defined alternatively broadly, the present invention is a seat post adaptor assembly for a cycle which includes a seat with at least two rails and a seat tube, the assembly comprising: (a) an integral adapter means having a top adaptor portion and a bottom extension post portion, the top adaptor portion having a bottom end, a rear portion and a front portion, the rear portion having a bore and an opening, the front portion having a slotted bore, the bottom extension post portion having a cylinder attachable to said seat tube of said seat, where the cylinder is integrally formed with the bottom end of said top adaptor portion; (b) a base plate means mounted to said adapter means and having a bore and at least two grooves; (c) at least one rocking arm integrally connected to said base plate means and having a proximal end and a distal end with a distal bore for allowing said base plate means to be independently adjusted in a vertical direction; and (d) a clamping means having a bore and at least two grooves for clamping to said base plate means, such that the bore is aligned with said bore of said base plate means, the at least two grooves being complementary to said at least two grooves of said base plate means respectively for allowing said at least two rails of said seat to be secured therein to independently adjust said seat in a horizontal direction; (e) whereby when said seat post adaptor assembly is assembled, the adjustment of said clamping means allows said seat to be independently adjusted in said horizontal direction, and the adjustment of said at least one rocking arm allows said seat to be independently adjusted in said vertical direction.

Defined alternatively more broadly, the present invention is a seat post adaptor assembly for a cycle which includes a seat, an extension tube attached to a seat tube, and connection means, the assembly comprising: (a) an adapter means having a top adaptor portion and a bottom extension post portion, the top adaptor portion having a bottom end, a rear portion and a front portion, the rear portion having a bore and an opening, the front portion having a transverse slotted bore and a longitudinal slotted bore, the bottom extension post portion having a cylinder attachable to said seat tube of said seat, where the cylinder is integrally formed with the bottom end of said top adaptor portion; (b) a base plate means mounted to said adapter means and having a bore and at least two grooves; (c) a single central rocking arm integrally connected to said base plate means and connected to said longitudinal slotted bore of said adapter means for allowing said base plate means to be independently adjusted in a vertical direction; and (d) a clamping means having a bore and at least two grooves for clamping to said base plate means, such that the bore is aligned with said bore of said base plate means, the at least two grooves being complementary to said at least two grooves of said base plate means respectively for allowing said connection means of said seat to be secured therein to independently adjust said seat in a horizonal direction; (e) whereby when said seat post adaptor assembly is assembled, the adjustment of said clamping means allows said seat to be independently adjusted in said horizontal direction, and the adjustment of said central rocking arm allows said seat to be independently adjusted in said vertical direction.

Defined further alternatively in detail, the present invention is a seat post adaptor assembly for a cycle which includes a seat, the assembly comprising: (a) an adapter member having a rear portion and a front portion; (b) a calibration scale means located on said adapter member and having a plurality of divisions for precisely adjusting an angle of said seat of said cycle; (c) a base plate member having a lower surface, the base plate member mounted to said adapter member; (d) at least one rocking arm integrally connected to said lower surface of said base plate member, the rocking arm having opposite ends; and (e) one of said opposite ends of said at least one rocking arm including an indicating marker for assisting in reading said calibration scale means on said adapter member.

Defined further alternatively broadly, the present invention is a seat post adaptor assembly for a cycle which includes a seat, the assembly comprising: (a) an adapter member having a rear portion and a front portion; (b) a calibration scale means located on said adapter member and having a plurality of divisions for precisely adjusting an angle of said seat of said cycle; (c) a base plate member having a lower surface, the base plate member mounted to said adapter member; (d) at least one rocking arm integrally connected to said lower surface of said base plate member; and (e) said at least one rocking arm including an indicating marker for assisting in reading said calibration scale means on said adapter member.

Defined further alternatively more broadly, the present invention is a seat post adaptor assembly for a cycle which includes a seat, the assembly comprising: (a) an adapter means having a rear portion and a front portion; and (b) a calibration scale means located on said adapter means and having a plurality of divisions for precisely adjusting an angle of said seat of said cycle.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An adjustable seat post adaptor assembly for a bicycle having a seat, at least two bars located underneath the seat, a seat tube and an extension post attached to the seat tube, the adjustable seat post adaptor assembly comprising:

a. an adapter member having a bottom end, a top end, a rear portion with a rear end, a middle portion, and a front portion with a front end, the rear and middle potions each having a horizontal bore, the front portion having a horizontal slotted curved bore, the adapter member further having a vertical opening located between the two horizontal bores of the rear and middle potions;

b. a calibration scale means located on said front end of said adapter member and having a plurality of divisions for precisely adjusting an angle of said seat of said bicycle;

c. a cylindrical member having one end integrally connected to said bottom end of said adapter member and the other end for connecting to said extension post;

d. a base plate member having a lower surface, an upper surface, a central bore, two transverse sides, two longitudinal sides, and two longitudinal opposite semi-circular grooves located on the upper surface and adjacent to and parallel to the two longitudinal sides respectively;

e. two rocking arms integrally connected to said lower surface of said base plate member and located between said central bore of said base plate member, each rocking arm having a proximal portion with a proximal end and a horizontal proximal bore, and a distal portion with a distal end and a horizontal distal bore, the distal portions extending away from said base plate member, where the distal ends of the two rocking arms include an indicating marker for assisting in reading said calibration scale means on said adapter member;

f. said base plate member mounted to said top end of said adapter member such that said central bore of said base plate member is located adjacent to said vertical opening of said adapter member, said horizontal proximal bores located adjacent to and aligned with said horizontal bore of said rear portion of said adapter member for hinging said base plate member to said adapter member;

g. said horizontal distal bores of said rocking arms being aligned with said horizontal slotted curved bore of said adapter member and fastened by a first threaded fastener means for allowing said base plate member to be independently adjusted in an up or down position; and h. an X-shaped clamping member having a central portion with a central bore and four extending tips each having a semi-circular groove for clamping onto said upper surface of said base plate member, such that the central bore is aligned with said central bore of said base plate member for receiving a second threaded fastener means extending therethrough to fasten the clamping member to said base plate member, the four semi-circular grooves being complementary to said two longitudinal opposite semi-circular grooves of said base plate member respectively for allowing said at least two bars of said seat to be secured therein to independently adjust said seat in a forward or backward direction;

i. whereby when said adjustable seat post adaptor assembly is assembled, said second threaded fastener means allows said seat of said bicycle to be independently adjusted in said forward or backward direction, and said first threaded fastener means allows said seat to be independently adjusted in said up or down direction.

2. The seat post adaptor assembly as defined in claim 1 wherein said X-shaped clamping member further includes a plurality of cavities for reducing weight of said adjustable seat post adaptor assembly.

3. The seat post adaptor assembly as defined in claim 1 wherein said adjustable seat post adaptor assembly is made out of light-weight aluminum material.

4. The seat post adaptor assembly as defined in claim 1 wherein said other end of said cylindrical member is for connecting to said extension post by press-fit engagement.

5. The seat post adaptor assembly as defined in claim 1 wherein said other end of said cylindrical member is for connecting to said extension post by bonding.

6. The seat post adaptor assembly as defined in claim 1 wherein said other end of said cylindrical member is for connecting to said extension post by welding.

7. A seat post adaptor assembly for a bicycle having a seat, at least two bars located underneath the seat, a seat tube and an extension post attached to the seat tube, the seat post adaptor assembly comprising:

a. an adapter member having a bottom end, a top end, a rear portion with a rear end, and a front portion with a front end, the rear portion having a horizontal bore and a vertical opening, and the front portion having a horizontal slotted curved bore;

b. a calibration scale means located on said adapter member and having a plurality of divisions for precisely adjusting an angle of said seat of said bicycle;

c. a cylindrical member having one end integrally connected to said bottom end of said adapter member and the other end for connecting to said extension post;

d. a base plate member having a lower surface, an upper surface, a bore, and at least two opposite parallel semi-circular grooves located on the upper surface, the base plate member mounted to said adapter member such that the bore of said base plate member is located adjacent to said vertical opening of said rear portion of said adapter member;

e. at least one rocking arm integrally connected to said lower surface of said base plate member, the least one rocking arm having a proximal end with a proximal horizontal bore, and a distal end with a horizontal distal bore, the proximal horizontal bore located adjacent to and aligned with said horizontal bore of said rear portion of said adapter member for hinging said base plate member to said adapter member, and the distal end extending away from said base plate member, where the distal end of the at least one rocking arm includes an indicating marker for assisting in reading said calibration scale means on said adapter member;

f. said horizontal distal bore of said at least one rocking arm being aligned with said horizontal slotted curved bore of said adapter member and fastened by a first fastener means for allowing said base plate member to be independently adjusted in an up or down position; and g. a clamping member having a bore and at least two opposite semi-circular grooves for clamping onto said upper surface of said base plate member, such that the bore is aligned with said bore of said base plate member for receiving a second fastener means extending therethrough to fasten the clamping member to said base plate member, the at least two opposite semi-circular grooves being complementary to said at least two opposite semi-circular grooves of said base plate member respectively for allowing said at least two bars of said seat to be secured therein to independently adjust said seat in a forward or backward direction;

h. whereby when said seat post adaptor assembly is assembled, said second fastener means allows said seat of said bicycle to be independently adjusted in said forward or backward direction, and said first fastener means allows said seat to be independently adjusted in said up or down direction.

8. The seat post adaptor assembly as defined in claim 7 wherein said clamping member further includes a plurality of cavities for reducing weight of said seat post adaptor assembly.

9. The seat post adaptor assembly as defined in claim 7 wherein said clamping member is generally an X-shape.

10. The seat post adaptor assembly as defined in claim 7 wherein said clamping member is generally a wide square shape which is the same size as said base plate member.

11. The seat post adaptor assembly as defined in claim 7 wherein said clamping member is generally a narrow rectangular shape.

12. The seat post adaptor assembly as defined in claim 7 wherein said seat post adaptor assembly is made out of light-weight aluminum material.

13. The seat post adaptor assembly as defined in claim 7 wherein said other end of said cylindrical member is for connecting to said extension post by press-fit engagement.

14. The seat post adaptor assembly as defined in claim 7 wherein said other end of said cylindrical member is for connecting to said extension post by bonding.

15. The seat post adaptor assembly as defined in claim 7 wherein said other end of said cylindrical member is for connecting to said extension post by welding.

16. A seat post adaptor assembly for a cycle which includes a seat, at least two rails located underneath the seat, a seat tube and an extension post attached to the seat tube, the seat post adaptor assembly comprising:

a. an adapter means having a bottom end, a rear portion, and a front portion, the rear portion having a bore and an opening, and the front portion having a slotted bore;

b. a tube means having one end integrally connected to said bottom end of said adapter means and the other end for connecting to said extension post;

c. a base plate means mounted to said adapter means and having a bore and at least two grooves;

d. a calibration scale means located on said adapter means and having a plurality of divisions for precisely adjusting an angle of said seat;

e. at least one rocking arm integrally connected to said base plate means and having a proximal end and a distal end with a distal bore for allowing said base plate means to be independently adjusted in a vertical direction, where the distal end of the at least one rocking arm includes an indicating marker for assisting in reading said calibration scale means on said adapter means; and f. a clamping means having a bore and at least two grooves for clamping to said base plate means, such that the bore is aligned with said bore of said base plate means, the at least two grooves being complementary to said at least two grooves of said base plate means respectively for allowing said at least two rails of said seat to be secured therein to independently adjust said seat in a horizontal direction;

g. whereby when said seat post adaptor assembly is assembled, the adjustment of said clamping means allows said seat to be independently adjusted in said horizontal direction, and the adjustment of said at least one rocking arm allows said seat to be independently adjusted in said vertical direction.

17. The assembly as defined in claim 16 wherein said clamping means further includes a plurality of cavities for reducing weight of said seat post adaptor assembly.

18. The assembly as defined in claim 16 wherein said clamping means is generally an X-shape.

19. The assembly as defined in claim 16 wherein said clamping means is generally a wide square shape which is the same size as said base plate means.

20. The assembly as defined in claim 16 wherein said clamping means is generally a narrow rectangular shape.

21. The assembly as defined in claim 16 wherein said seat post adaptor assembly is made out of aluminum material.

22. The assembly as defined in claim 16 wherein said front portion of said adapter means further comprises a front end slotted opening.

23. The assembly as defined in claim 22 wherein said distal bore of said at least one rocking arm is connected inbetween said front end slotted opening for allowing said base plate means to be independently adjusted in said vertical direction and fastened by a fastener means.

24. A seat post adaptor assembly for a cycle which includes a seat, a seat tube, an extension tube attached to the seat tube, and connection means, the seat post adaptor assembly comprising:
   a. an adapter means having a bottom end, an access opening, and a slotted bore;
   b. a tube means having one end integrally connected to said bottom end of said adapter means and the other end for connecting to said extension tube;
   c. a base plate means mounted to said adapter means and having a bore and at least two grooves;
   d. a calibration scale means having a plurality of divisions for precisely adjusting an angle of said seat of said cycle;
   e. a single central rocking arm integrally connected to said base plate means and connected to said slotted bore of said adapter means such that said base plate means can be independently adjusted in a tilting angle, the single central rocking arm having an indicating marker for assisting in reading said calibration scale means; and
   f. a clamping means having a bore and at least two grooves for clamping to said base plate means, such that the bore is aligned with said bore of said base plate means and secured together by a fastener, the at least two grooves being complementary to said at least two grooves of said base plate means respectively for allowing said connection means of said seat to be secured therein, where the fastener is easily accessible through said access opening on said adapter means for independently adjusting said seat in a horizonal direction;
   g. whereby when said seat post adaptor assembly is assembled, the adjustment of said clamping means allows said seat to be independently adjusted in said horizontal direction, and the adjustment of said central rocking arm allows said seat to be independently adjusted in said tilting angle.

25. A seat post adaptor assembly for a bicycle having a seat, at least two bars located underneath the seat and a seat tube, the assembly comprising:
   a. an integral adapter member having a top adaptor portion and a bottom extension post portion, the top adaptor portion having a bottom end, a top end, a rear portion with a rear end, and a front portion with a front end, the rear portion having a horizontal bore and a vertical access opening, the front portion having a horizontal slotted curved bore, the bottom extension post portion having an elongated cylinder for attaching to said seat tube of said seat, where the elongated cylinder is integrally formed with the bottom end of said top adaptor portion;
   b. a calibration scale means located on said adapter member and having a plurality of divisions for precisely adjusting an angle of said seat of said bicycle;
   c. a base plate member having a lower surface, an upper surface, a bore, and at least two opposite parallel semi-circular grooves located on the upper surface, the base plate member mounted to said adapter member such that the bore of said base plate member is located above said vertical access opening of said rear portion of said adapter member;
   d. at least one rocking arm integrally connected to said lower surface of said base plate member, the least one rocking arm having a proximal end with a proximal horizontal bore, and a distal end with a horizontal distal bore, the proximal horizontal bore located adjacent to and aligned with said horizontal bore of said rear portion of said adapter member for hinging said base plate member to said adapter member, the distal end having an indicating marker for assisting in reading said calibration scale means and extending away from said base plate member;
   e. said horizontal distal bore of said at least one rocking arm being aligned with said horizontal slotted curved bore of said adapter member and fastened by a first fastener means for allowing said base plate member to be independently adjusted in a tilting angle; and
   f. a clamping member having a bore and at least two opposite semi-circular grooves for clamping onto said upper surface of said base plate member, such that the bore is aligned with said bore of said base plate member for receiving a second fastener means extending therethrough to fasten the clamping member to said base plate member, the at least two opposite semi-circular grooves being complementary to said at least two opposite semi-circular grooves of said base plate member respectively for allowing said at least two bars of said seat to be secured therein, where the second fastener means is easily accessible through said vertical access opening on said adapter member for independently adjusting said seat in a forward or backward direction;
   g. whereby when said seat post adaptor assembly is assembled, said second fastener means allows said seat of said bicycle to be independently adjusted in said forward or backward direction, and said first fastener means allows said seat to be independently adjusted in said tilting angle.

26. A seat post adaptor assembly for a cycle which includes a seat, at least two rails and a seat tube, the assembly comprising:
   a. an integral adapter means having a top adaptor portion and a bottom extension post portion, the top adaptor portion having a bottom end, a rear portion and a front portion, the rear portion having a bore and an access opening, the front portion having a slotted bore, the bottom extension post portion having a cylinder for attaching to said seat tube of said seat, where the cylinder is integrally formed with the bottom end of said top adaptor portion;

b. a base plate means having a bore and at least two grooves;

c. a calibration scale means having a plurality of divisions for precisely adjusting an angle of said seat of said cycle;

d. at least one rocking arm integrally connected to said base plate means and having a proximal end and a distal end, the proximal end hingeably attached to said rear portion of said adapter means, the distal end having an indicating marker for assisting in reading said calibration scale means and adjustably attached to said slotted bore of said front portion of said adapter means such that said base plate means can be independently adjusted in a tilting angle; and e. a clamping means having a bore and at least two grooves for clamping to said base plate means, such that the bore is aligned with said bore of said base plate means and secured together by a fastener, the at least two grooves being complementary to said at least two grooves of said base plate means respectively for allowing said at least two rails of said seat to be secured therein, where the fastener is easily accessible through said access opening on said adapter means for independently adjusting said seat in a horizontal direction;

f. whereby when said seat post adaptor assembly is assembled, the adjustment of said clamping means allows said seat to be independently adjusted in said horizontal direction, and the adjustment of said at least one rocking arm allows said seat to be independently adjusted in said tilting angle.

27. A seat post adaptor assembly for a cycle which includes a seat, a seat tube, and connection means, the assembly comprising:

a. an adapter means having a top adaptor portion and a bottom extension post portion, the top adaptor portion having a bottom end, a rear portion and a front portion, the rear portion having an access opening, the front portion having a longitudinal slotted bore, the bottom extension post portion having a cylinder for attaching to said seat tube of said seat, where the cylinder is integrally formed with the bottom end of said top adaptor portion;

b. a calibration scale means having a plurality of divisions for precisely adjusting an angle of said seat of said cycle;

c. a base plate means mounted to said adapter means and having a bore and at least two grooves;

d. a single central rocking arm integrally connected to said base plate means and adjustably connected to said longitudinal slotted bore of said adapter means for allowing said base plate means to be independently adjusted in a tilting angle, the single central rocking arm having an indicating marker for assisting in reading said calibration scale means; and e. a clamping means having a bore and at least two grooves for clamping to said base plate means, such that the bore is aligned with said bore of said base plate means and secured together by a fastener, the at least two grooves being complementary to said at least two grooves of said base plate means respectively for allowing said connection means of said seat to be secured therein, where the fastener is easily accessible through said access opening on said rear portion of said adapter means for independently adjusting said seat in a horizonal direction;

f. whereby when said seat post adaptor assembly is assembled, the adjustment of said clamping means allows said seat to be independently adjusted in said horizontal direction, and the adjustment of said central rocking arm allows said seat to be independently adjusted in said vertical direction.

28. A seat post adaptor assembly for a cycle which includes a seat, the assembly comprising:

a. an adapter member having a rear portion and a front portion;

b. a calibration scale means located on said adapter member and having a plurality of divisions for precisely adjusting an angle of said seat of said cycle;

c. a base plate member having a lower surface, the base plate member mounted to said adapter member;

d. at least one rocking arm integrally connected to said lower surface of said base plate member, the rocking arm having opposite ends; and e. one of said opposite ends of said at least one rocking arm including an indicating marker for assisting in reading said calibration scale means on said adapter member.

29. The assembly as defined in claim 28 wherein said calibration scale means is located on said front portion of said adapter member.

30. A seat post adaptor assembly for a cycle which includes a seat, the assembly comprising:

a. an adapter member having a rear portion and a front portion;

b. a calibration scale means located on said adapter member and having a plurality of divisions for precisely adjusting an angle of said seat of said cycle;

c. a base plate member having a lower surface, the base plate member mounted to said adapter member;

d. at least one rocking arm integrally connected to said lower surface of said base plate member; and e. said at least one rocking arm including an indicating marker for assisting in reading said calibration scale means on said adapter member.

31. A seat post adaptor assembly for a cycle which includes a seat, the assembly comprising:

a. an adapter means;

b. a calibration scale means having a plurality of divisions for precisely adjusting an angle of said seat of said cycle;

c. a base plate means mounted to said adapter means;

d. at least one arm means connected to and extending from said base plate means for allowing said base plate means to be independently adjusted in a vertical direction; and e. means for assisting in reading said calibration scale means.

32. The assembly as defined in claim 31 wherein said calibration scale means is located on said adapter means.

33. An adjustable seat post adaptor assembly for a bicycle having a seat, at least two bars located underneath the seat, a seat tube and an extension post attached to the seat tube, the adjustable seat post adaptor assembly comprising:

a. an adapter member having a bottom end, a top end, a rear portion with a rear end, a middle portion, and a front portion with a front end, the rear and middle portions each having a horizontal bore, the front portion having a horizontal slotted curved bore, the adapter member further having a vertical opening located between the two horizontal bores of the rear and middle portions;

b. a calibration scale means located on said front end of said adapter member and having a plurality of divisions for precisely adjusting an angle of said seat of said bicycle;

c. a cylindrical member having one end integrally connected to said bottom end of said adapter member and the other end for connecting to said extension post;

d. a base plate member having a lower surface, an upper surface, a central bore, two transverse sides, two longitudinal sides, and two longitudinal opposite semi-circular grooves located on the upper surface and adjacent and parallel to the two longitudinal sides respectively;

e. two rocking arms integrally connected to said lower surface of said base plate member and located between said central bore of said base plate member, each rocking arm having a proximal portion with a proximal end and a horizontal proximal bore, and a distal portion with a distal end and a horizontal distal bore, the distal portions extending away from said base plate member, where the distal ends of the two rocking arms include an indicating marker for assisting in reading said calibration scale means on said adapter member;

f. said base plate member mounted to said top end of said adapter member such that said central bore of said base plate member is located adjacent to said vertical opening of said adapter member, said horizontal proximal bores located adjacent to and aligned with said horizontal bore of said rear portion of said adapter member for hinging said base plate member to said adapter member;

g. said horizontal distal bores of said rocking arms being aligned with said horizontal slotted curved bore of said adapter member and fastened by a first threaded fastener means for allowing said base plate member to be independently adjusted in an up or down position; and h. an X-shaped clamping member having a central portion with a central bore, a plurality of cavities for reducing weight on said adjustable seat post adaptor assembly and four extending tips each having a semi-circular groove for clamping onto said upper surface of said base plate member, such that the central bore is aligned with said central bore of said base plate member for receiving a second threaded fastener means extending therethrough to fasten the clamping member to said base plate member, the four semi-circular grooves being complementary to said two longitudinal opposite semi-circular grooves of said base plate member respectively for allowing said at least two bars of said seat to be secured therein to independently adjust said seat in a forward or backward direction;

i. whereby when said adjustable seat post adaptor assembly is assembled, said second threaded fastener means allows said seat of said bicycle to be independently adjusted in said forward or backward direction, and said first threaded fastener means allows said seat to be independently adjusted in said up or down direction.

34. The seat post adaptor assembly as defined in claim 33 wherein said seat post adaptor assembly is made out of light-weight aluminum material.

35. The seat post adaptor assembly as defined in claim 33 wherein said other end of said cylindrical member is for connecting to said extension post by press-fit engagement.

36. The seat post adaptor assembly as defined in claim 33 wherein said other end of said cylindrical member is for connecting to said extension post by bonding.

37. The seat post adaptor assembly as defined in claim 33 wherein said other end of said cylindrical member is for connecting to said extension post by welding.

38. A seat post adaptor assembly for a bicycle having a seat, at least two bars located underneath the seat, a seat post and an extension post attached to seat tube, the seat post adaptor assembly comprising:

a. an adapter member having a bottom end, a top end, a rear portion with a rear end, and a front portion with a front end, the rear portion having a horizontal bore and a vertical opening, and the front portion having a horizontal slotted curved bore;

b. a calibration scale means located on said adapter member and having a plurality of divisions for precisely adjusting an angle of said seat of said bicycle;

c. a cylindrical member having one end integrally connected to said bottom end of said adapter member and the other end for connecting to said extension post;

d. a base plate member having a lower surface, an upper surface, a bore, and at least two opposite parallel semi-circular grooves located on the upper surface, the base plate member mounted to said adapter member such that the bore of said base plate member is located adjacent to said vertical opening of said rear portion of said adapter member;

e. at least one rocking arm integrally connected to said lower surface of said base plate member, the least one rocking arm having a proximal end with a proximal horizontal bore, and a distal end with a horizontal distal bore, the proximal horizontal bore located adjacent to and aligned with said horizontal bore of said rear portion of said adapter member for hinging said base plate member to said adapter member, and the distal end extending away from said base plate member, where the distal end of the at least one rocking arm includes an indicating marker for assisting in reading said calibration scale means on said adapter member;

f. said horizontal distal bore of said at least one rocking arm being aligned with said horizontal slotted curved bore of said adapter member and fastened by a first fastener means for allowing said base plate member to be independently adjusted in an up or down position; and g. a clamping member having a bore, a plurality of cavities for reducing weight on said seat post adaptor assembly and at least two opposite semi-circular grooves for clamping onto said upper surface of said base plate member, such that the bore is aligned with said bore of said base plate member for receiving a second fastener means extending therethrough to fasten the clamping member to said base plate member, the at least two opposite semi-circular grooves being complementary to said at least two opposite semi-circular grooves of said base plate member respectively for allowing said at least two bars of said seat to be secured therein to independently adjust said seat in a forward or backward direction;

h. whereby when said seat post adaptor assembly is assembled, said second fastener means allows said seat of said bicycle to be independently adjusted in said forward or backward direction, and said first fastener means allows said seat to be independently adjusted in said up or down direction.

39. The seat post adaptor assembly as defined in claim 38 wherein said clamping member is generally an X-shape.

40. The seat post adaptor assembly as defined in claim 38 wherein said clamping member is generally a wide square shape which is the same size as said base plate member.

41. The seat post adaptor assembly as defined in claim 38 wherein said clamping member is generally a narrow rectangular shape.

42. The seat post adaptor assembly as defined in claim 38 wherein said seat post adaptor assembly is made out of light-weight aluminum material.

43. The seat post adaptor assembly as defined in claim 38 wherein said other end of said cylindrical member is for connecting to said extension post by press-fit engagement.

44. The seat post adaptor assembly as defined in claim 38 wherein said other end of said cylindrical member is for connecting to said extension post by bonding.

45. The seat post adaptor assembly as defined in claim 38 wherein said other end of said cylindrical member is for connecting to said extension post by welding.

46. A seat post adaptor assembly for a cycle which includes a seat, at least two rails, a seat tube and an extension post attached to the seat tube, the seat post adaptor assembly comprising:

a. an adapter means having a bottom end, a rear portion, and a front portion, the rear portion having a bore and an opening, and the front portion having a slotted bore;

b. a calibration scale means located on said adapter means and having a plurality of divisions for precisely adjusting an angle of said seat;

c. a tube means having one end integrally connected to said bottom end of said adapter means and the other end for connecting to said extension post;

d. a base plate means mounted to said adapter means and having a bore and at least two grooves;

e. at least one rocking arm integrally connected to said base plate means and having a proximal end and a distal end with a distal bore for allowing said base plate means to be independently adjusted in a vertical direction; and f. a clamping means having a bore, a plurality of cavities for reducing weight on said seat post adaptor assembly and at least two grooves for clamping to said base plate means, such that the bore is aligned with said bore of said base plate means, the at least two grooves being complementary to said at least two grooves of said base plate means respectively for allowing said at least two rails of said seat to be secured therein to independently adjust said seat in a horizontal direction;

g. whereby when said seat post adaptor assembly is assembled, the adjustment of said clamping means allows said seat to be independently adjusted in said horizontal direction, and the adjustment of said at least one rocking arm allows said seat to be independently adjusted in said vertical direction.

47. The assembly as defined in claim 46 wherein said distal end of said at least one rocking arm includes an indicating marker for assisting in reading said calibration scale means on said adapter means.

48. The assembly as defined in claim 46 wherein said clamping means is generally an X-shape.

49. The assembly as defined in claim 46 wherein said clamping means is generally a wide square shape which is the same size as said base plate means.

50. The assembly as defined in claim 46 wherein said clamping means is generally a narrow rectangular shape.

51. The assembly as defined in claim 46 wherein said seat post adaptor assembly is made out of aluminum material.

52. The assembly as defined in claim 46 wherein said front portion of said adapter means further comprises a front end slotted opening.

53. The assembly as defined in claim 52 wherein said distal bore of said at least one rocking arm is connected inbetween said front end slotted opening for allowing said base plate means to be independently adjusted in said vertical direction and fastened by a fastener means.

\* \* \* \* \*